July 29, 1924.
H. DILAS
COMBINED CANDY BOX AND RECEPTACLE FILE
Filed Aug. 11, 1922      2 Sheets-Sheet 1
1,502,910
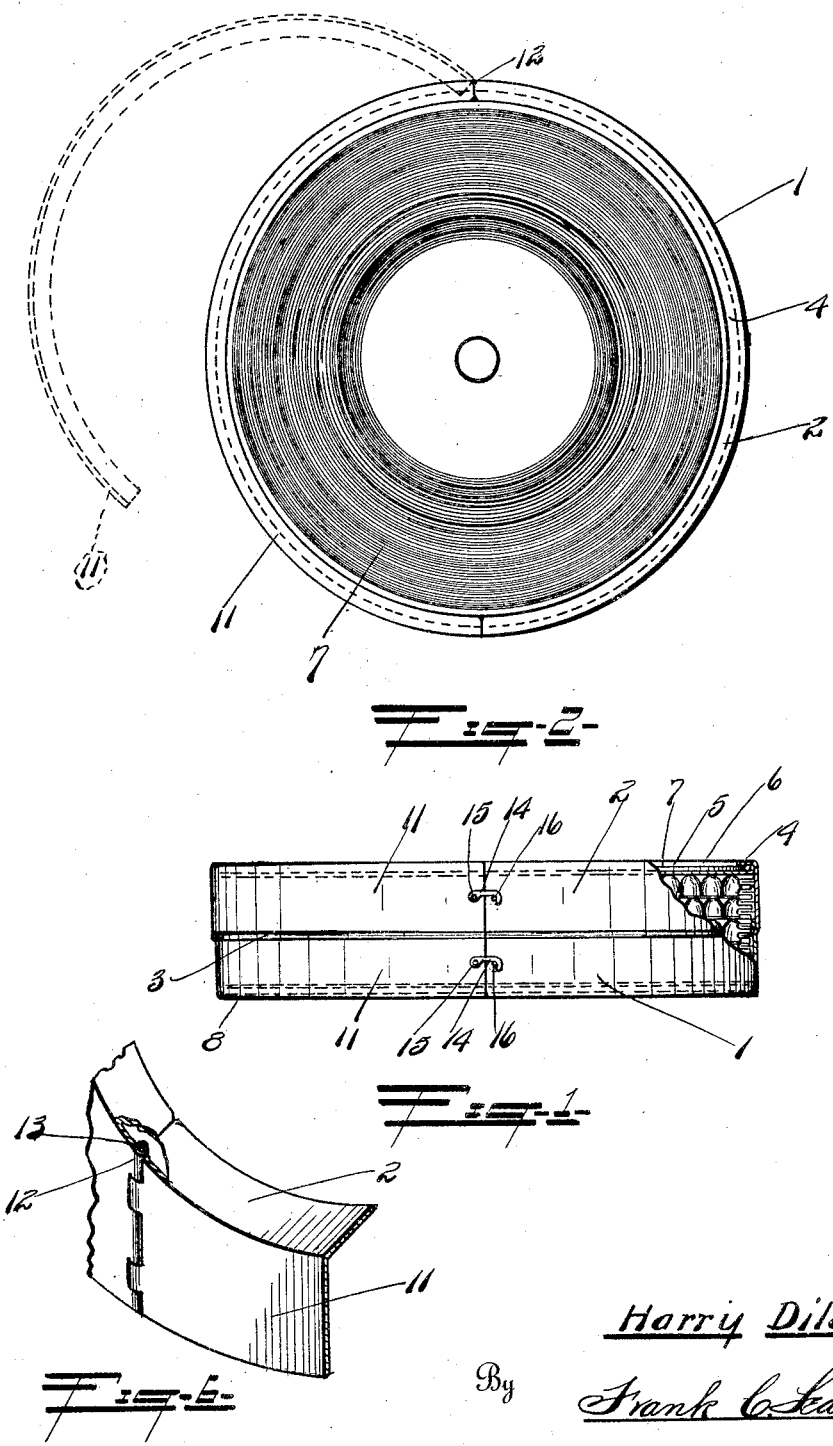
Inventor
Harry Dilas,
By Frank C. Searman,
Attorney

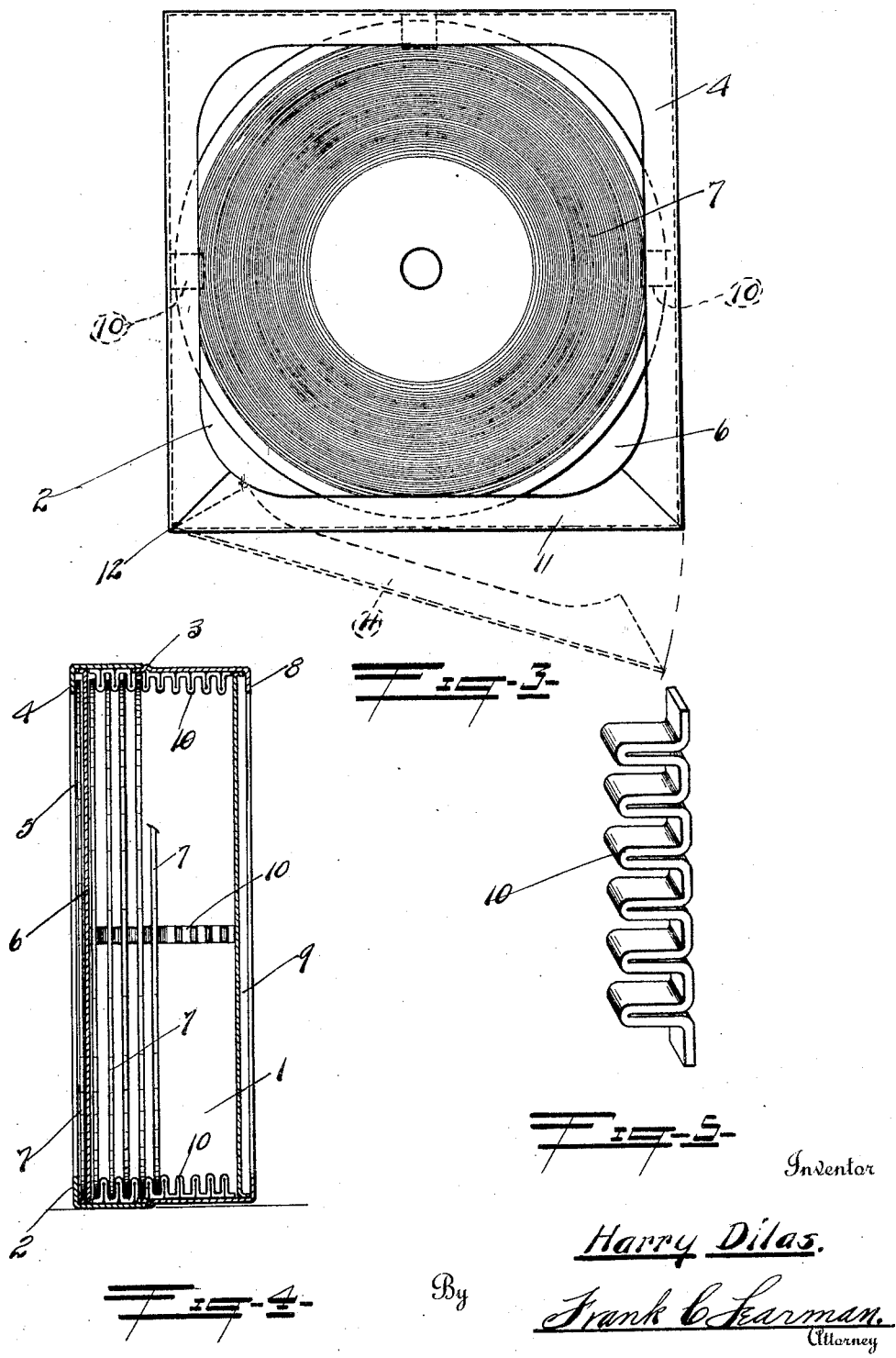

Patented July 29, 1924.

1,502,910

UNITED STATES PATENT OFFICE.

HARRY DILAS, OF BAY CITY, MICHIGAN.

COMBINED CANDY BOX AND RECEPTACLE FILE.

Application filed August 11, 1922. Serial No. 581,142.

*To all whom it may concern:*

Be it known that I, HARRY DILAS, a citizen of the United States of America, and a resident of Bay City, in the county of Bay and State of Michigan, have invented certain new and useful Improvements in Combined Candy Boxes and Receptacle Files, of which the following is a specification.

My invention relates to a combined candy box and record file.

The prime object of the invention is to design a box or receptacle which can be used as a talking machine record file after the candy or confectionery has been removed therefrom.

Another object of the invention is to design a box or receptacle having a space or chamber in the top and bottom in which records can be inserted, so that the purchaser of a box of confectionery will receive either one or two records with the confectionery thereby combining and stimulating the sales of both candy and records.

A still further object of the invention is to design a neat and durable box or receptacle which will be inexpensive to manufacture and of neat and pleasing appearance.

The above and other objects will appear as the specification progresses, reference being had to the accompanying drawings, in which like reference numerals indicate like parts throughout the several views thereof.

In the drawings:—

Fig. 1 is a part sectional side edge view of my improved box or container illustrating it filled with candy.

Fig. 2 is a top plan view thereof, the dotted lines illustrating the doors in open position.

Fig. 3 is a view similar to Figure 2 and illustrating the same idea embodied in a square box or receptacle.

Fig. 4 is an enlarged cross sectional view showing the box used as record file.

Fig. 5 is an isometric view of one of the record shelves or supports, and

Fig. 6 is an enlarged fragmentary sectional view illustrating the hinging of the doors.

Fancy candy and confectionery boxes are constructed to be attractive and pleasing to the eye, consequently these boxes are expensive and after the candy is removed therefrom are generally destroyed, and I have therefore designed a box which can be used to advantage after the candy has been removed therefrom, and without materially increasing the manufacturing cost thereof.

Referring now particularly to the drawings in which I have shown the preferred embodiment of my invention, the numeral 1 indicates the box or receptacle proper which can be constructed of any suitable material desired, but I prefer to stamp it out of sheet metal, and take advantage of punch and die work, as well as obtaining a firm and rigid structure.

This box is provided with a cover 2 which is fitted to the bottom section in the usual manner, a bead 3 being formed on this bottom section and serves as a stop for the cover. The box as shown in Figures 1, 2, 4 and 6 is round in shape, and is more economical to build than the square box illustrated in Figure 3, and while I shall herein specifically describe a round box, it will be understood that the square box can be constructed and used for the same purpose.

The side wall of the cover 2 is made up of a strip of metal the top edge 4 of which is bent inwardly to form a chamber 5 between this bent edge and the top wall 6 which is secured therein, sufficient space being allowed to accommodate a talking machine record 7, and it will be obvious that this top wall 6 forms the bottom of the compartment or chamber 5 and prevents the record from coming in contact with the candy when the box is filled. The bottom edge 8 is made up in an identical manner, a chamber 9 being formed therein and which is also adapted to contain a record if desired, the edge of the metal protecting the fragile record and also supporting the box proper.

Record supports or shelves 10 are formed of a single strip of metal being bent as clearly shown in Figure 5 of the drawing, and are soldered or otherwise suitably secured to the interior of the box in spaced relation, individual strips being secured to the top and bottom box sections respectively, so that the cover may be removed without in any manner interfering with the bottom section. These strips do not interfere with the filling of the box with candy which is usually filled in superimposed layers with a heavy paper between and it will be apparent that either one or two records can be included with each box of candy.

After the candy is removed the box is cleaned and is then ready to be used as a record file and to facilitate the inserting and removing of the records from the box a pair of doors 11 are hinged to the top and bottom side members, the metal being bent as shown at 12 in Fig. 6 to form a hinge, a pin 13 being inserted therein, the edges of the doors are formed in a similar manner and are adapted to be mounted on the pin for swinging outwardly as shown by the dotted lines in Figures 2 and 3. A hook or latch 14 is pivotally connected to the box at 15, and a pin 16 is anchored in the side strip so that when the door is swung to closed position, the hooks will engage the pins on the box and hold the doors in closed position.

Talking machine cabinets are generally provided with a plurality of compartments therein for the storage of records, and these boxes will fit therein exactly the same as the record books which are especially designed for the purpose.

The same idea is embodied in the square box shown in Fig. 3 of the drawings, it is made up in a similar manner, the one side serving as a door, which swings open and latches in the same manner.

From the foregoing description it will be obvious that I have perfected a new and novel combined candy box and record file.

What I claim is:—

1. A combined confectionery box and record file, comprising a receptacle the upper edges of which are bent inwardly to form individual compartments on the top and bottom respectively, record files or shelves on the interior of the receptacle, and doors hingedly secured thereto to facilitate the inserting or removal of the records.

2. A combined confectionery box and record file comprising a receptacle, the upper edges of which are bent inwardly to form individual compartments on the top and bottom respectively, record files or shelves secured on the interior of the receptacle in spaced relation, doors hingedly secured thereto to facilitate the insertion or removal of the records, and means for securing the doors in closed position.

In testimony whereof I affix my signature.

HARRY DILAS.